United States Patent [19]

Mizote et al.

[11] Patent Number: 4,460,035
[45] Date of Patent: Jul. 17, 1984

[54] AIR-CONDITIONING METHOD AND SYSTEM FOR AN AUTOMOTIVE VEHICLE WITH NONVOLATILE MEMORY FEATURE

[75] Inventors: Masanori Mizote, Yokosuka; Yasuyuki Uekusa, Yokohama, both of Japan

[73] Assignee: Nissan Motor Company, Limited, Yokohama, Japan

[21] Appl. No.: 357,073

[22] Filed: Mar. 11, 1982

[30] Foreign Application Priority Data

Mar. 12, 1981 [JP] Japan .................................. 56-34536

[51] Int. Cl.³ ...................... G05D 23/00; B60H 3/04; F24F 7/00
[52] U.S. Cl. ...................................... 165/12; 165/16; 165/42; 62/161; 364/148
[58] Field of Search .................. 165/2, 12, 16, 23, 24, 165/25, 28, 42, 43; 236/13, 49; 62/161; 364/148, 151, 152, 153; 98/2.01

[56] References Cited

U.S. PATENT DOCUMENTS

| | | | |
|---|---|---|---|
| 3,315,730 | 4/1967 | Weaver et al. | |
| 3,403,855 | 11/1968 | Bouthors et al. | 98/2.01 |
| 4,311,188 | 1/1982 | Kojima et al. | 165/2 |
| 4,335,847 | 6/1982 | Levine | 165/12 |
| 4,344,565 | 8/1982 | Kojima et al. | 165/12 |
| 4,345,714 | 8/1982 | Kojima | 165/12 |
| 4,358,050 | 11/1982 | Nasanoma et al. | 165/42 |
| 4,364,513 | 12/1982 | Tsuzuki et al. | 165/43 |

FOREIGN PATENT DOCUMENTS 56-10640  2/1981  Japan ..................................... 165/16

*Primary Examiner*—William R. Cline
*Assistant Examiner*—Peggy A. Neils
*Attorney, Agent, or Firm*—Lowe, King, Price & Becker

[57] ABSTRACT

An air-conditioning method and system for an automotive vehicle for controlling passenger compartment air temperature under comfortable air control conditions, that is, under comfortable outlet duct air volume and temperature according to the perception of individual passengers, once the control conditions are adjusted by the passenger. The air-conditioning system according to the present invention comprises, in addition to a microcomputer, a temperature sensor, a temperature preset device, and the like, a blower-fan motor speed selector manually operated by the passenger, a non-volatile memory unit for storing the manually-adjusted blower-fan motor speeds classified on the basis of difference between detected air temperature and preset air temperature, vehicle travelling conditions, and the time elapsed since the system was turned on. In the first five minutes of operation the system can memorize a desired sequence of blower speeds selected by the occupant as well as the temperature difference between the compartment and outdoors and the vehicle speed. This information is stored in nonvolatile memory so that when the system is subsequently restarted, and the same environmental conditions exist, the desired blower speeds are implemented. The system also has an automatic mode in which blower speeds are selected from a pre-programmed table.

12 Claims, 7 Drawing Figures

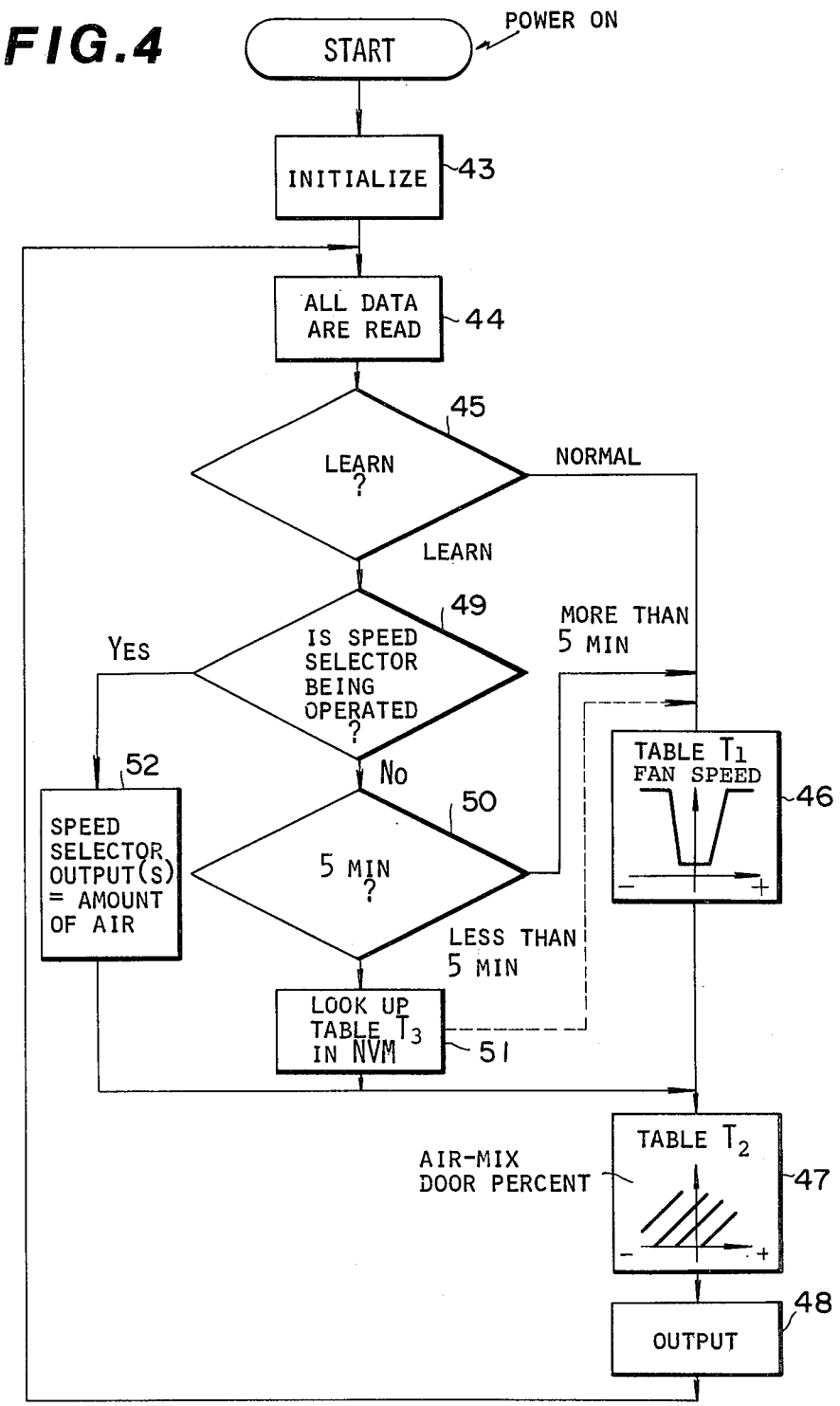

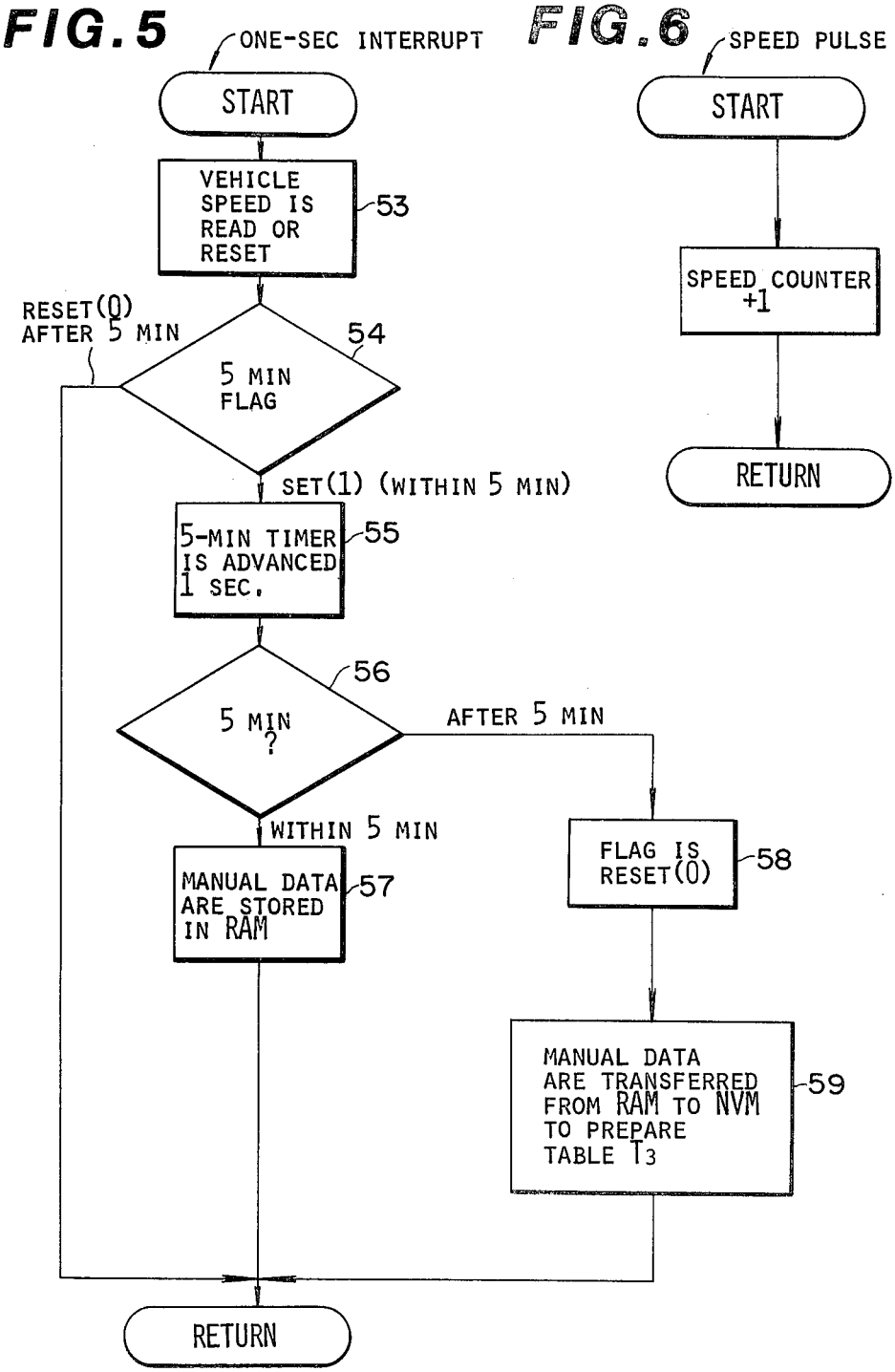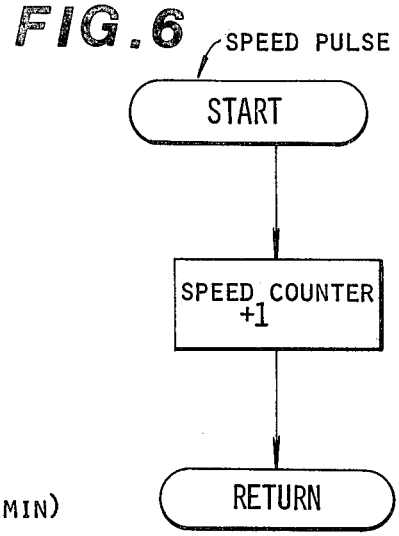

FIG.7

TABLE T3

| ADDRESS | INITIAL DIFFERENCE | RUN-STOP | TIME(MIN) | BLOWER SPEED DATA S |
|---|---|---|---|---|
| 1 | +10°C OR MORE | STOP | 0 ~ 0.5 | 0 ⟶ 5 |
| 2 | | | 0.5 ~ 1.0 | 0 ⟶ 5 |
| 3 | | | 1.0 ~ 1.5 | 0 ⟶ 3 |
| 4 | | | 1.5 ~ 2.0 | 0 |
| 5 | | | 2.0 ~ 2.5 | 0 |
| 6 | | | 2.5 ~ 3.0 | 0 |
| 7 | | | 3.0 ~ 3.5 | 0 |
| 8 | | | 3.5 ~ 4.0 | 0 |
| 9 | | | 4.0 ~ 4.5 | 0 |
| 10 | | | 4.5 ~ 5.0 | 0 |
| 11 | | RUN | 0 ~ 0.5 | 0 |
| 12 | | | 0.5 ~ 1.0 | 0 |
| 13 | | | 1.0 ~ 1.5 | |
| 14 | | | 1.5 ~ 2.0 | 0 ⟶ 3 |
| 15 | | | 2.0 ~ 2.5 | 0 ⟶ 3 |
| 16 | | | 2.5 ~ 3.0 | 0 |
| 17 | | | 3.0 ~ 3.5 | 0 |
| 18 | | | 3.5 ~ 4.0 | 0 |
| 19 | | | 4.0 ~ 4.5 | 0 |
| 20 | | | 4.5 ~ 5.0 | 0 |
| 21 | +8 ~ +10°C | STOP | 0 ~ 0.5 | 0 |
| 22 | | | 0.5 ~ 1.0 | 0 |
| 23 | | | 1.0 ~ 1.5 | 0 |
| 24 | | | 1.5 ~ 2.0 | 0 |
| 25 | | | 2.0 ~ 2.5 | 0 |
| 26 | | | 2.5 ~ 3.0 | 0 |
| 27 | | | 3.0 ~ 3.5 | 0 |
| 28 | | | 3.5 ~ 4.0 | 0 |

AIR-CONDITIONING METHOD AND SYSTEM FOR AN AUTOMOTIVE VEHICLE WITH NONVOLATILE MEMORY FEATURE

BACKGROUND OF THE INVENTION

1. Field of the Invention

The present invention relates to an air conditioning method and system used for an automotive vehicle, and more specifically to the air-conditioning method and system in which air temperature at which a passenger compartment is maintained is automatically and repeatedly adjusted by comfortable-temperature control parameters (outlet-duct air temperature and outlet-duct air volume) which vary according to the sensitivity of individual passengers, once the control parameters are adjusted by the passenger.

2. Description of the Prior Art

Recently, automotive vehicles have been provided with an air conditioner which can maintain air temperature within the passenger compartment at an appropriate temperature.

In a prior-art air-conditioning system, air is drawn in through an air intake duct by a blower fan and is cooled by a cooling unit. After being cooled, part of the introduced air is directed toward a heating unit and remixed with the unheated air. The heated air is proportioned with the unheated portion of the introduced air by an air mix door in order to maintain the air entering the passenger compartment at the temperature required to bring or hold the passenger compartment air temperature at a desired level. Further, in this case, an air intake door is usually provided in order to selectively effect outside-air introduction or inside-air recirculation. The outside-air introduction mode is used for refreshing the air within the passenger compartment with fresh air and the inside-air recirculation mode is used for cooling or heating the air within the passenger compartment quickly and efficiently.

In such prior-art air-conditioning system, once the passenger presets a desired passenger compartment air temperature, the passenger compartment air is automatically adjusted to the desired temperature. However, since personal perception of comfort with respect to air conditioning parameters, such as outlet-duct air volume and temperature, may vary, the passenger will sometimes be dissatisfied with control conditions under which the passenger compartment air temperature is being adjusted. For instance, some passengers may be comfortable when cooled air is strongly outputted from an air outlet duct when the passenger compartment is being cooled, while other passengers may be comfortable when cooled air is only moderately outputted from an air outlet duct when the passenger compartment is being cooled.

Therefore, even if the passenger compartment air temperature is automatically controlled to a preset desired air temperature, the control conditions such as outlet-duct air temperature or outlet-duct air volume do not necessarily match variations in passenger's perception of comfortable control conditions. Thus, the pasengers will be forced to go through the annoying procedure of manually adjusting the air conditioner controls in response to changes in his perception of comfort.

A more detailed description of the prior-art passenger compartment air conditioning method or system will be made hereinafter with reference to the attached drawing under DETAILED DESCRIPTION OF THE PREFERRED EMBODIMENTS.

SUMMARY OF THE INVENTION

With these problems in mind therefore, it is the primary object of the present invention to provide an air conditioning method and system for controlling the temperature of air within the passenger compartment under air control conditions matching the passenger's perception of comfort as previously indicated by the passenger.

In other words, passenger compartment air temperature is automatically and repeatedly controlled to a preset desired air temperature under comfortable temperature control conditions (outlet-duct air temperature, outlet-duct air volume, etc.), once these conditions are adjusted by the passengers.

To achieve the above mentioned objects, the air-conditioning method of controlling the passenger compartment air temperature under comfortable control conditions according to the present invention includes the steps of detecting blower-fan motor speed manually selected by the passenger, storing the detected blower-fan motor speeds classified according to difference in temperature between passenger compartment air temperature and preset desired passenger compartment air temperature, vehicle travelling conditions, the time elapsed since the air-conditioning system was turned on, etc., and controlling the air-conditioning system in accordance with the stored blower-fan motor speed.

To achieve the above-mentioned object, the air-conditioning system for controlling the passenger compartment air temperature under comfortable control conditions according to the present invention comprises a blower-fan motor speed selector manually operable by the passenger, a non-volatile memory for storing manually-selected blower-fan motor speeds classified according to the difference between passenger compartment air temperature and preset desired passenger compartment air temperature, vehicle travelling conditions, the time elapsed since the air-conditioning system was turned on, in addition to a microcomputer, a temperature sensor, a temperature preset device, etc.

BRIEF DESCRIPTION OF THE DRAWINGS

The features and advantages of the air-conditioning method and system for controlling temperature within a passenger compartment under comfortable control conditions to match variations in passenger's perception according to the present invention will be more clearly appreciated from the following description taken in conjunction with the accompanying drawings in which like reference numerals designate corresponding elements and in which:

FIG. 4 is a flowchart of a main routine used for program control in the preferred embodiment shown in FIG. 3;

FIG. 5 is a flowchart of a subroutine for storing manual operation output data (blower-fan motor speeds) employing the time-interrupt method;

FIG. 6 is a flowchart of a subroutine for preparing vehicle speed data; and

FIG. 7 is a sample look-up table showing manual operation output data prepared by the subroutine of FIG. 5.

DETAILED DESCRIPTION OF THE PREFERRED EMBODIMENTS

To facilitate understanding of the present invention, a brief reference will be made to a prior-art air-conditioning system with reference to the attached drawing.

Figure 1:
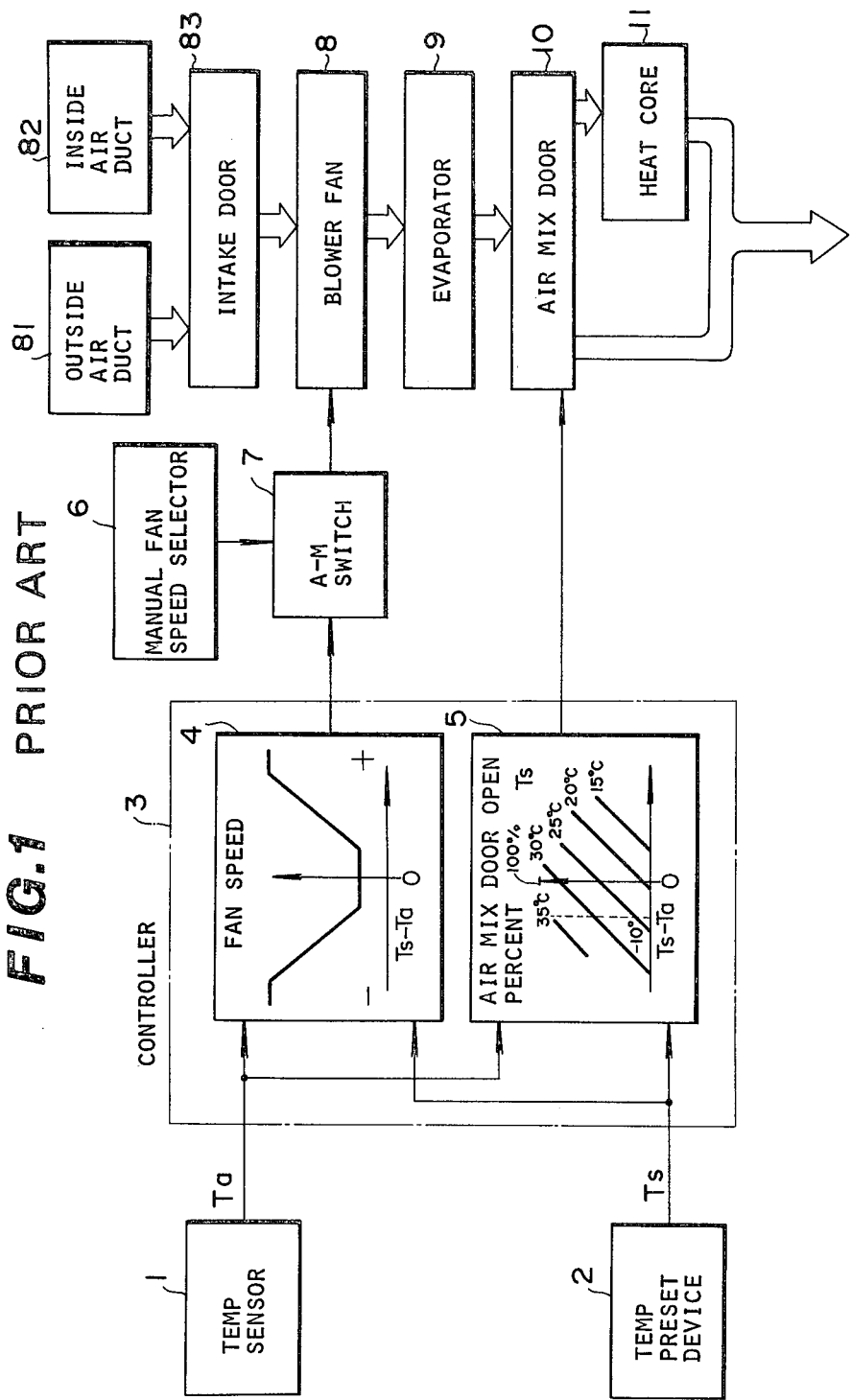
FIG. 1 is a diagrammatic illustration of typical prior-art air conditioning system.

FIG. 1 shows a diagrammatical illustration of an example prior-art air-conditioning system.

In the prior-art system, the temperature and the volume of air to be outputted into a passenger compartment are controlled in relation to the difference (Ta—Ts) between the passenger compartment air temperature Ta and the preset target air temperature Ts in accordance with predetermined control conditions so that the passenger compartment air temperature Ta will eventually equal the predetermined target air temperature Ts. That is to say, when a passenger temperature sensor 1 detects passenger compartment temperature Ta and a passenger compartment presetting device 2 is set to a predetermined desired target air temperature Ts by one of passengers, signals Ts and Ta are both inputted to a control unit 3. And next, a blower-fan motor speed determining circuit 4 determines the volume of air to be outputted and an air-mix door opening percentage determining circuit 5 determines the mix-ratio of cold air to hot air according to the preset target air temperature Ts.

As a method of determining blower-fan motor speed by using the fan speed determining circuit 4, there exists, for instance, a method in which fan speed is controlled in accordance with a speed control pattern as shown in the graphical representation in FIG. 1. In this case, the fan speed is minimized when temperature difference (Ta—Ts) is below a predetermined level and the fan speed is increased in proportion to an increase in temperature difference (Ta—Ts) when the temperature difference is beyond a predetermined level.

Further, the air-mix door opening percentage determining circuit 5 well-known in the art of automotive air conditioning determines the opening-percentage of the air-mix door with the preset target air temperature Ts as a parameter in accordance with a proportion control or proportion integral control depending upon temperature difference (Ta—Ts) as shown by the graphical representation also in FIG. 1. For instance, if a predetermined target air temperature Ts is 20° C. and the passenger compartment air temperature Ta is 30° C., the difference between Ts and Ta is −10° C. In this case, since there is no intersection between the oblique line Ts=20° C. and the vertical line Ts−Ta=−10° C., the air-mix door opening percentage is zero. Further, if Ts and Ta are both 30° C., since Ts−Ta is zero, the air-mix door opening percentage is about 80 percent.

In the proportion control or the proportion integral control, some external factors such as outside-air temperature, temperature increase due to solar heat, or temperature increase due to passengers' bodies are taken into consideration for effecting an appropriate correction, in addition to the temperature difference, so that the opening percentage can be determined under an optimum control parameters.

The mechanism section of the air-conditioning system activated by the signals from the controller section 3 comprises an outside air introduction duct 81 and an inside air introduction duct 82, which are selectably opened to the system by an intake door 83, an air blower fan 8 for drawing air from the outside or inside air introduction ducts 81 or 82 and propelling it through the system and into the passenger compartment, an evaporator 9 to cool and dehumidify the air drawn in by the blower fan 8, and an air-mix door 10 to distribute some part of the air cooled by the evaporator 9 into a heater core 11 to reheat it. In this case, the air reheated by the heater core 11 is mixed with the cool air fed from the air mix door 10 and next is outputted into the passenger compartment through an air outlet duct switching device (not shown).

Further, in a prior-art air-conditioning system, in addition to the control circuit section 3, there are provided a manual blower-fan motor speed selector 6 by which a passenger can directly determine blower-fan motor speed, and an automatic-manual switch 7 to switch the control mode from automatic blower-fan motor speed control to manual blower-fan motor speed control, or vice versa.

Therefore, a fan-speed command signal generated by the fan-speed determining circuit 4 within the control circuit section 3 is applied to the blower fan 8 to determine the volume of air to be outputted. Simultaneously, an air-mix door open percentage command signal generated from the air-mix door open percentage determining circuit 5 activates the air-mix door 10; the distribution ratio of the cool air to hot air is changed to control air temperature to be outputted into the passenger compartment; variation in temperature within the passenger compartment is detected by the passenger compartment air temperature sensor 1; the detected passenger compartment air temperature is fed back to the control circuit section 3, so that the passenger compartment air temperature is automatically maintained at a preset passenger compartment air temperature.

In such an air-conditioning system as described above, when the passenger turns on the power supply and presets a desired passenger compartment air temperature, the passenger compartment air temperature is automatically controlled so as to be maintained at the preset passenger compartment air temperature, therefore, it is possible to retain a comfortable air temperature within the passenger compartment.

It is noted, however, that in the air-conditioning system described above, the blower fan motor speed and the air temperature to be outputted are determined on the basis of a predetermined control pattern or calculation expressions including various heat condition such as outside-air temperature, temperature increase due to solar heat, a preset passenger compartment air temperature etc. That is, the optimum passenger compartment air temperature is controlled on the basis of heat quantity equilibrium. In this case, however, since the desired temperature and volume to be outputted vary according to individual persons, even if the passenger compartment air temperature is controlled in the above-mentioned method, the passengers are often not satisfied with the instantaneous air-control conditions.

For instance, one person may be comfortable when cooled air is strongly outputted in the case where passenger compartment is cooled, while other persons may not be comfortable when cooled air is outputted too strongly or may be uneasy about noise generated by the blower fan.

Thus, under automatic control, the control conditions best suited to achieving and maintaining the desired air temperature may be perceived as being uncomfortable to the passenger. The passengers may override automatic control with a manual fan-speed selector, but it is inconvenient to repeatedly adjust the selector to changing control and passenger perception conditions.

In view of the above description, there now follows a description of the present invention with reference to the attached drawings.

Figure 2:
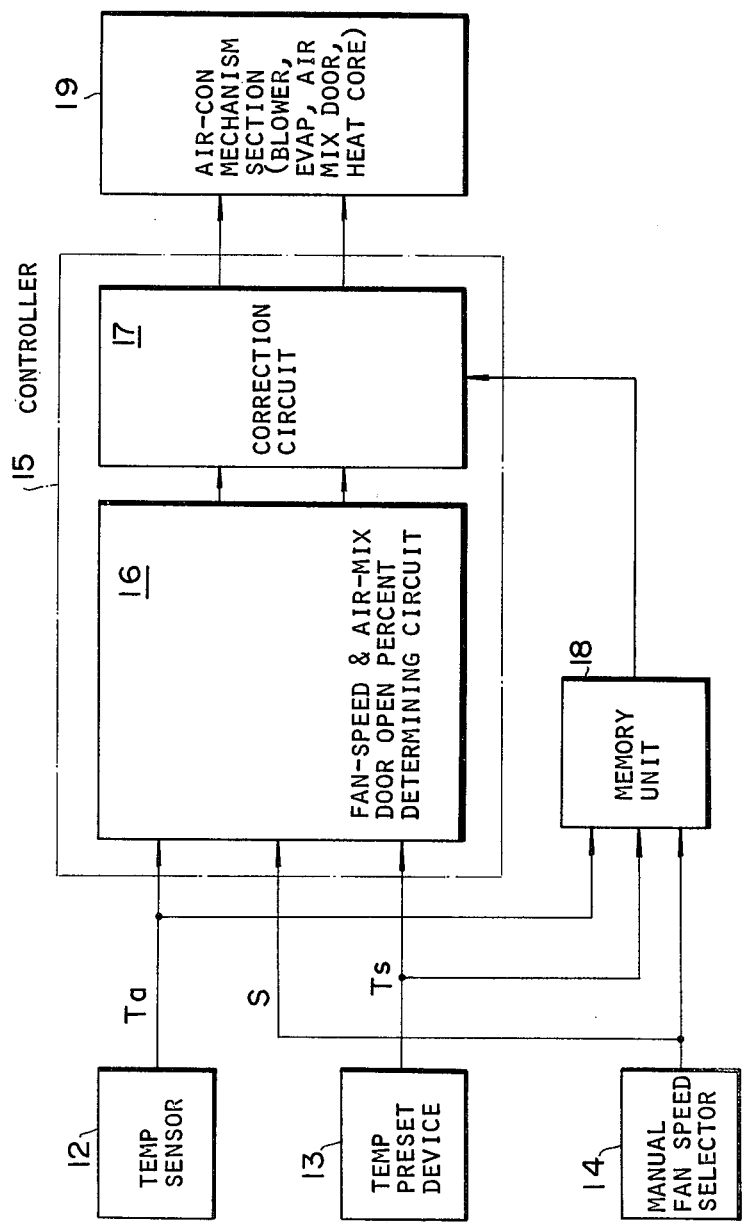
FIG. 2 is a schematic block diagram of a basic system configuration of an air-conditioning system according to the present invention.

FIG. 2 is a schematic block diagram showing the basic configuration of the present invention.

In the figure, the reference numeral 12 denotes a passenger compartment air temperature sensor such as a thermistor to detect passenger compartment air temperature Ta, the numeral 13 denotes a passenger compartment presetting device to preset a desired target passenger compartment air temperature Ts, and the numeral 14 denotes a blower-fan motor speed selector for changing the blower fan speed in response to manual operation by the passenger. The reference numeral 15 denotes a controller section including a control parameter determining circuit 16 having a blower-fan motor speed determining circuit and an air-mix door opening-percentage determining circuit as previously shown in FIG. 1 and a correction circuit 17 to correct the command signals from the control circuit 16. The reference numeral 18 denotes a memory unit for storing the output of the fan-speed adjuster 14 operated by the passenger, including the passenger compartment air temperature Ta detected by the passenger compartment air temperature sensor 12 and the preset target passenger compartment air temperature Ts preset by the presetting device 13. The data stored in the memory unit 18 is outputted to the correction circuit 17 to correct the respective command signals for blower-fan motor speed and air-mix door opening percentage outputted from the control parameter determining circuit 16.

The reference numeral 19 denotes a mechanism section for the air-conditioning system which can control the temperature and volume of air to be outputted on the basis of the control signals from the controller section 15. As in the conventional air-conditioning system, the mechanical section 19 comprises a blower fan, an evaporator, an air-mix door, a heater core, etc.

Figure 3:
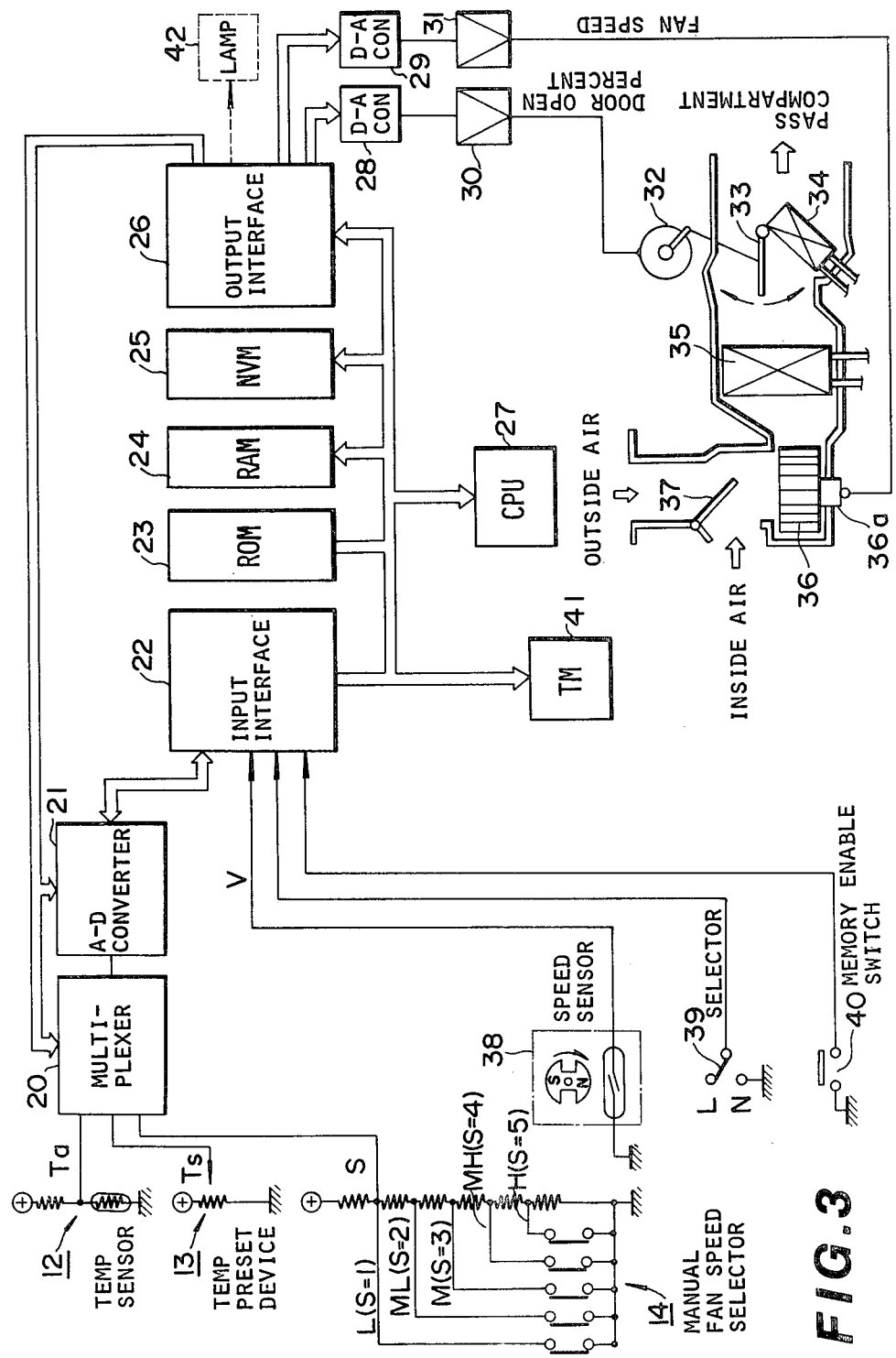
FIG. 3 is a partially-diagrammatic illustration and partially-schematic block diagram of a system configuration of an air-conditioning system according to the present invention, in which a microcomputer is used.

FIG. 3 is a more detailed schematic block diagram of FIG. 2, which illustrates an embodiment according to the present invention. In this embodiment the controller section 15 and the memory unit 18 are operated by control programs stored in a microcomputer.

In the figure, the passenger compartment air temperature sensor 12 is a thermosensitive element such as a thermistor connected via a bias resistor to a power supply. The passenger compartment presetting device 13 is a slidable, variable resistor. The fan-speed adjuster 14 is a plurality of push-button switches which constitute a voltage divider circuit to output various output voltages indicative of low speed, medium low speed, medium speed, medium high speed, and high speed. The respective outputs Ta, Ts, and S of the passenger compartment air temperature sensor 12, the passenger compartment air temperature presetting device 13, and the fan-speed adjuster 14 are all applied to a multiplexer 20, and are sampled in a time-sharing method depending upon the scanning sequence of the multiplexer 20. The outputs from the multiplexer are converted into corresponding digital signals through an A/D converter 21.

The microcomputer for performing air-conditioning control comprises an input interface 22, a program memory (ROM) 23, a data memory (RAM) 24, a non-volatile memory (NVM) 25, an output interface 26, a central processing unit (CPU) 27, and a timer 41. In contrast to a standard microcomputer, the microcomputer used for the present invention is provided with a non-volatile memory 25 in which data can be maintained even after the power supply is turned off. The data outputted from the fan-speed adjuster 14 operated by the passenger are stored in this non-volatile memory 25, after being classified according to various factors, as will be described later.

In addition to the output signals applied from the A-D converter 21 to the input interface 22, there are connected the respective output lines of a vehicle speed sensor 38, a selector switch 39 operated by the passenger to dictate the control mode, either memory-controlled (in learn control mode) or the usual control (in normal control mode), and a store-enabling switch 40 to permit the data outputted from the fan-speed adjuster 14 operated by the passenger to be stored into the non-volatile memory 25.

Additionally, to an output interface 26 of the microcomputer are connected D-A converters 28 and 29. The respective analog signals outputted from the D-A converters 28 and 29 are applied to the mechanical section of the air-conditioning system, after being amplified by amplifiers 30 and 31, respectively.

The mechanical section of the air-conditioning system according to the present invention comprises an intake door 37 determining the source (either outside or inside) of air drawn into the air conditioning system, a blower fan 36 for driving air through the air conditioner at a rate determined by the revolution speed of a blower-fan motor 36a, an evaporator 35 for cooling and dehumidifying the air, an air-mix door 33 for controlling the amount of air to be reheated by a heater core 34, and a servo mechanism 32 for actuating the air-mix door 33 via a link and a rod to a determined opening percentage in accordance with the signals from the amplifier 30. Concerning this servo mechanism 32, a conventional servo mechanism is used in which a motor is driven by a servo amplifier, and a potentiometer detects the opening percentage of the air-mix door actuated by the motor and sends a signal back to the motor for feedback control. In this embodiment, it is of course possible to position the air-mix door 33 via a vacuum actuator such as a diaphragm after the signals from the amplifier 30 have been converted into the corresponding vacuum output signals by using a voltage-to-pressure transducer. Also, since the output of the amplifier 31 is connected to the motor 36a of the blower fan 36, the amount of air to be outputted is varied by controlling the revolution speed of the motor via the output signals from the amplifier 31.

Next, the control of blower-fan motor speed according to the present invention will be described.

First, when the controller is switched into automatic mode, as described for the prior-art air-conditioning system previously shown in FIG. 1, the blower-fan motor speed is automatically controlled in accordance with the difference between passenger compartment air temperature Ta and preset passenger compartment air temperature Ts.

On the other hand, in the case when the fan speed is selected manually, the fan speed tends to be frequently changed to match the passenger's perception of comfortable control conditions, during the first several minutes of system operation. Therefore, in the present invention, if the manual fan-speed selector is operated by the passenger within five minutes after the system has been started, the resulting output data are stored in the non-volatile memory 25, and the passenger compartment air temperature is controlled in accordance with the data stored in the memory 25 whenever the system is operated again.

FIG. 4 is a flowchart of a general operation program for the air-conditioning system according to the present invention. FIG. 5 is a flowchart of a timer interrupt routine initiated by the timer 41 every second. FIG. 6 is a flowchart of a vehicle speed interrupt routine initiated in response to pulses from the vehicle speed sensor 38.

The following is a description of the execution of the program flowchart of FIG. 4, which is the main program.

First, when the power supply is turned on, the program starts and the system is initialized in accordance with a program stored in the program memory (ROM) 23 (block 43). This initialization routine resets every register in the central processing unit 27 (referred to as CPU, hereinafter), the timer 41 and a flag (explained in detail later) to their respective initial conditions. Next, the CPU 27 sends a scanning command signal to the multiplexer 20 via the output interface 26 to read various data such as passenger compartment air temperature Ta, preset passenger compartment air temperature Ts, and manual fan-speed selector output S sequentially. After being converted into the corresponding digital data through the A-D converter 21, these data are temporarily stored in the data memory (RAM) 24 via the input interface 22 (block 44).

In reading data from a thermistor used as the passenger compartment air temperature sensor 12, since the resistance value decreases with increasing passenger compartment air temperature, the detector voltage also decreases; that is, voltages read in from the sensor 12 must be compared to an inversely proportional temperature curve in order to be converted to passenger air temperature. Also, since the passenger compartment presetting device 13 generates a voltage proportional to the position of the sliding terminal of the slidable variable resistor, the voltage signals can be easily converted into the corresponding temperature selection data. In addition, since fan speed selector 14 is provided with a plurality of self-return-type push-button switches representative of the respective fan speeds: Low(1), Middle Low(2) Middle(3), Middle high(4) and High(5), the output voltage changes according to the switch which is depressed. Therefore, depending upon this output voltage, it is possible to determine which fan speed switches are depressed, and to temporarily store this information in the data memory 24.

Additionally, in block 44, the data from the vehicle speed sensor 38, the N-L selector switch 39, and the memory-enable switch 40 are all directly read into the data memory (RAM) 24 through the input interface 22.

In block 45, the program checks whether the selector switch 39 is set to the normal side (N) or the learn side (L). If in normal control mode (N), the control system is operated in accordance with the data stored in the program memory (ROM) 23. In this case, the fan speed is determined according to temperature difference (Ta−Ts) with reference to table T$_1$ (speed control pattern) as described the prior-art system of FIG. 1 (block 46). Also, an air-mix door opening percentage according to temperature difference (Ta−Ts) is determined with reference to table T$_2$ (air-mix door control pattern) as described in the prior-art system of FIG. 1 (block 47). Thereafter, these signals representative of appropriate fan speed and air-mix door opening percentage are outputted through the output interface 26. After having been converted into the corresponding analog signals via the D-A converters 28 and 29, these signals are applied respectively via the amplifier 30 to the servo mechanism 32 so that the air-mix door 33 is actuated to a position corresponding to the determined air-mix door opening percentage value, and via the amplifier 31 to the blower fan motor 36a so that the blower fan motor operates at a revolution speed suitable for producing the air pressure difference required to drive air through the system at the determined rate (block 48).

On the other hand, if in learn control mode (L), the control system is operated in accordance with the data stored in the non-volatile memory (NVM) 25. In this case, first, it is determined whether the manual fan-speed selector 14 has been operated or not (block 49). If it has not been operated, it is next determined whether five minutes have elapsed since the power supply was turned on (block 50). If five (or more) minutes have elapsed, the program advances to block 46 to control the system with reference to the tables T$_1$ and T$_2$ stored in the program memory (ROM) 23, in the same manner as in the normal control mode. On the other hand, if five minutes have not elapsed (less than five minutes), the program advances to block 51 to control the system with reference to the table T$_3$ stored in the non-volatile memory (NVM) 25. As described in more detail hereinafter, this table T$_3$ lists the output data (S$_1$−S$_5$) of the manual fan-speed selector 14 in the form of a classification on the basis of temperature difference (Ta−Ts), vehicle travelling condition (run or stop), and the time elapsed since the system was started.

In the case when no data are stored in the table T$_3$, the program advances to block 46, as shown by dashed lines, to control the blower-fan motor speed in the normal control mode.

Further, if one of the push-buttons of the fan speed selector 14 is depressed at block 49, the output data of the manual fan-speed selector as chosen by the passenger are directly used to control the blower-fan motor speed; in other words, manual operation by the passenger has priority over automatic control.

Now follows a description of the procedure for storing the output data of the manual fan speed selector when operated by the passenger as determined by the subroutine shown in FIG. 5, which is executed in response to a one-second timer interrupt while the main routine shown in FIG. 4 is being executed.

Whenever a one-second interrupt signal is generated by the timer 41, the subroutine starts. First, the vehicle speed is read and reset every second (block 53). This vehicle speed reading and resetting in block 53 are performed in conjunction with the vehicle speed pulse count interrupt subroutine shown in FIG. 6. This vehicle speed pulse count subroutine is started whenever a pulse generated by the vehicle speed sensor 38, acting as an interrupt signal, is received by the CPU, so that the value in a counter (a memory address holding the current vehicle speed pulse count) provided in the data memory (RAM) 24 is incremented by one. After one second has elapsed, the counted value during that second, that is, the number of pulses is read out as vehicle speed data. The value thus counted in the counter is used to determine vehicle travelling condition (run or stop) and for preparing data to be transferred to table $T_3$ in the non-volatile memory 25.

Therefore, in block 53 in FIG. 5, the value in the counter, that is, vehicle speed data produced by the subroutine of FIG. 6 are read or reset every second.

Next, the program determines whether or not a timing flag is set (block 54). This flag is made up of a single bit of the data memory (RAM)24. The flag is set to "1" for the first five minutes after the power supply is turned on and is reset to "0" after five minutes.

If the flag is "1", that is, during the first five minutes, the five-minute timer is advanced by one second (block 55). Next, it is determined whether or not the timer has recorded five minutes since the power supply was turned on (block 56). If five minutes have elapsed, the program resets the flag to "0" (block 58). In addition, the output data S of the fan-speed selector 14 manually operated by the passenger, which are now temporarily stored in the data memory (RAM)24, are transferred to the non-volatile memory 25 in order to be included in data table $T_3$ used at the block 51 of the main routine shown in FIG. 4 (block 59).

On the other hand, if five minutes have not elapsed in block 56, the output data S of the fan-speed selector 14 manually operated by the passenger are scanned and temporarily stored in the data memory 24, together with vehicle speed data and time data.

In block 54 of FIG. 5, if the flag is reset to "0", that is, if more than five minutes have elapsed, control is returned to the main routine.

Transfer of data from RAM 24 to the data table $T_3$ in the non-volatile memory 25 in block 59 will be described with reference to FIG. 7.

In the figure, the table $T_3$ is classified into three fields. A first field identifies the initial temperature difference, specifically identifying whether the initial temperature difference between passenger compartment air temperature Ta and preset passenger compartment air temperature Ts when the power supply is turned on is more than 10° C., +8° to +10° C., . . . , or less than −10° C. The table $T_3$ is next divided into "stop" and "run" subfields on the basis of vehicle travelling conditions for each initial air temperature field. Further, by assigning one address for each half-minute interval of the travelling condition subfields, the manual data S used to determine the amount of air to be outputted can be stored in a precise, functionally-allocated address.

For example, in the event that the preset passenger compartment air temperature is 24° C., the passenger compartment air temperature when the power supply is turned on is 35°, the switch H (S=5) of the fan speed selector 14 is depressed immediately after the power supply is turned on, the switch M (S=3) is depressed after one minute, the vehicle is started after one and a half minutes, and the selector switch 39 is returned to Normal (N) after two and a half minutes. In this case, the data table $T_3$ is prepared as follows: since the initial difference is +11° C., the addresses 1–20 are first selected. Since the vehicle is stopped, the addresses 1–10 are next selected. Since the switch H (S=5) is depressed immediately after the power supply is turned on and maintained for 1 minute, the data at address 1 is changed from "0" to "5" and the data at address 2 is also changed from "0" to "5". Since the switch M (S=3) is depressed after one minute, the data at address 3 is changed from "0" to "3". Since the vehicle is started after one and a half minutes, the addresses 11–20 are next selected. Since the switch M (S=3) is operated for two and a half minutes until the selector switch 39 is changed to Normal, the data at addresses 14 and 15 are changed from "0" to "3". Since the selector switch 39 is returned to Normal after two and a half minutes, other addresses are all left as they are, that is, "0".

As described above, the data prepared for the data table $T_3$ by the data memory 24 are transferred to the non-volatile memory 25 five minutes after the system is turned on, as explained in regard to the subroutine in FIG. 5. In this case, even if the power supply is turned off, the data are reserved as updated. In this embodiment, the transfer into the non-volatile memory 25 is performed for the block determined according to the initial passenger compartment air temperature difference.

In addition, while one subfield describing the vehicle operation is being rewritten, the other data thereof are kept intact without change. When data is transferred to an address of the non-volatile memory 25 with other data already stored therein, the newly transferred data has priority. However, if the power supply is turned off within five minutes, no data are transferred. Notice that after the data transfer in block 59 has been completed, since the flag has already been reset, the interrupt program will no longer execute block 55 in FIG. 5, but will return to the main routine shown in FIG. 4.

On the other hand, in the embodiment shown in FIG. 3, the data transfer to the above-mentioned non-volatile memory 25 can be disenabled by the memory-enable switch 40. Therefore, at block 59 of the subroutine shown in FIG. 5, the data are transferred as follows: a data transfer request is indicated to the operator by lighting the indicator lamp 42 (in FIG. 3); if the memory-enable switch 40 is turned on within a predetermined period of time, for example, within ten seconds, the data will be transferred; when the switch 40 is not turned on within ten seconds, the data will not be transferred.

Accordingly, since the manual output data of the fan-speed selector is stored at the passenger's direction, it is possible to prevent inappropriate data from being stored into the non-volatile memory in a case such as a temporary driver.

Further, in the embodiment described above, although fan-speed values are stored in steps of a half minute, it is also possible to categorize them as functions of difference between air temperature and preset air temperature for time ranges such as morning, daytime, or night; seasons; days of the week; or weather, etc.

Further, in the embodiment described above, the output data of the fan-speed selector are stored according to three parameters: temperature difference, travelling condition, and time elapsed; however, it is possible to use more than three or less than three parameters or other parameters such as sunshine, humidity, outside air temperature, etc. The more parameters, the more comfortably the passenger compartment air temperature control conditions will be controlled.

Further, in the embodiment described above, the passenger compartment air temperature is controlled on the basis of fan speed; however, not being limited to this, it is possible to adjust the air temperature control conditions on the basis of changes in preset passenger compartment air temperature, control of humidity, selection of air blow mode (switching of outlet ducts or outlet duct directions) in such a way that the manual output data operated by the passenger are first stored and the passenger compartment air temperature is controlled in accordance with the stored data. In this case, it is of course possible to dictate that the manual output data be stored within any given time period after the power supply is turned on, not being limited to five minutes.

As described above, according to the present invention, since temperature of air to be outputted is automatically controlled on the basis of the difference between passenger compartment air temperature and preset passenger compartment air temperature, and since the temperature control is performed on the basis of the manual output data provided by the passenger and stored in the memory unit, when the operation is once adjusted to match variations in the passengers' perception of comfortable air temperature condition, it is possible to repeatedly control the passenger compartment air temperature according to passenger's preference once the supply power is turned on.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. An air-conditioning method for an automotive vehicle air conditioning system in which passenger compartment air temperature is controlled, having a blower fan motor and an air-mix door, which comprises the steps of:
    (a) detecting passenger compartment air temperature $T_a$;
    (b) presetting a desired passenger compartment air temperature $T_s$;
    (c) determining the speed of the blower-fan motor in accordance with a predetermined relationship between blower-fan motor speed and the difference between passenger compartment air temperature $T_a$ and preset passenger compartment air temperature $T_s$;
    (d) determining the opening percentage of the air-mix door in accordance with a predetermined relationship between air-mix door opening percentage and the difference between passenger compartment air temperature $T_a$ and preset passenger compartment air temperature $T_s$ with the preset passenger compartment air temperature $T_s$ as the parameter;
    (e) detecting a sequence of blower-fan motor speeds manually selected by a passenger and classified in accordance with the difference between the detected temperature $T_a$ and the preset temperature $T_s$;
    (f) storing the detected passenger compartment air temperature $T_a$, the preset passenger compartment air temperature $T_s$, and the sequence of blower fan motor speeds selected by the passenger;
    (g) correcting the determined blower-fan motor speed in accordance with the detected sequence of blower fan motor speeds as classified in accordance with the difference between the stored passenger compartment air temperature $T_a$ and the stored preset passenger compartment air temperature $T_s$;
    (h) operating the blower fan at the corrected blower-fan motor speed; and
    (i) actuating the air-mix door at the determined air-mix door opening percentage,
    whereby passenger compartment air temperature is maintained at a preset desired value with the blower-fan motor operated at the speeds manually selected by the passenger.

2. An air conditioning method for an automotive vehicle air conditioning system in which passenger compartment air temperature is controlled having a blower-fan motor and an air-mix door, as set forth in claim 1, which further comprises the steps of:
    (a) detecting vehicle speed;
    (b) storing the detected vehicle speed; and
    (c) correcting the determined blower-fan motor speed in accordance with the detected sequence of blower fan motor speeds as classified in accordance with the difference between the stored compartment temperature $T_a$ and the stored preset compartment temperature $T_s$ and by the detected vehicle speed.

3. An air conditioning method for an automotive vehicle air conditioning system in which passenger compartment air temperature is controlled having a blower-fan motor and an air-mix door, as set forth in claim 2, which further comprises the steps of:
    (a) selecting either a normal control mode or a learn control mode;
    (b) controlling the air-conditioning system without correcting the determined blower-fan motor speed and the determined air-mix door opening percentage when the normal control mode is selected; and
    (c) controlling the air-conditioning system by correcting the determined blower-fan motor speed in accordance with the detected sequence of blower fan motor speeds as classified in accordance with the difference between the stored passenger compartment air temperature $T_a$ and the stored preset passenger compartment air temperature $T_s$ and by the detected vehicle speed when the learn control mode is selected.

4. An air conditioning method for an automotive vehicle air conditioning system in which passenger compartment air temperature is controlled having a blower fan motor and an air-mix door as set forth in claim 3, which further comprises the steps of:
    (a) detecting whether the passenger wants the air conditioning system to be controlled in the normal control mode or in the learn control mode;
    (b) storing the detected sequence of blower fan motor speeds when the passenger wants the system to be controlled in the learn control mode; and
    (c) not storing the detected sequence of blower fan motor speeds when the passenger wants the system to be controlled in the normal control mode.

5. An air conditioning method for an automotive vehicle air conditioning system in which passenger compartment air temperature is controlled having a blower fan motor and an air-mix door as set forth in claim 4, which further comprises the steps of:
    (a) measuring the time elapsed after the air conditioning system is started;
    (b) controlling the air-conditioning system in the normal control mode without correcting the determined blower-fan motor speed after a predetermined time period subsequent to starting of the system; and
    (c) controlling the air-conditioning system in the learn control mode by correcting the determined blower-fan speed only within a predetermined time period subsequent to starting of the system.

6. An air-conditioning method for an automotive vehicle air conditioning system in which passenger compartment air temperature is controlled having a blower fan motor and an air-mix door, which comprises the steps of:
(a) detecting passenger compartment air temperature Ta;
(b) presetting a desired passenger compartment air temperature Ts;
(c) detecting a blower-fan motor speed selector state S manually selected by a passenger;
(d) detecting vehicle speed V;
(e) storing the detected passenger compartment air temperature Ta, the preset passenger compartment air temperature Ts, the blower-fan motor speed selector state S, and the detected vehicle speed V;
(f) selecting either (1) a normal control mode in which the air-conditioning system is controlled in accordance with a predetermined relationship between blower-fan motor speed and the difference between passenger compartment air temperature Ta and preset passenger compartment air temperature Ts and in accordance with a predetermined relationship between air-mix door opening percentage and the difference between passenger compartment air temperature Ta and preset passenger compartment air temperature Ts or (2) a learn control mode in which the air-conditioning system is controlled in accordance with the stored detected passenger compartment air temperature Ta, the stored preset passenger compartment air temperature Ts, the stored blower-fan motor speed selector state S, and the stored detected vehicle speed V;
(g) if in the normal control mode, controlling the air-conditioning system in the normal control mode;
(h) if in the learn control mode, determining whether or not the blower-fan motor speed selector has been manually operated;
(i) if not operated, determining whether or not a predetermined time period has elapsed after the system has been started;
(j) if more than the predetermined time period has elapsed, controlling the system in the normal control mode;
(k) if less than the predetermined time period has elapsed, controlling blower-fan motor speed in the learn control mode and air-mix door opening percentage in the normal control mode;
(l) if the blower-fan motor speed selector has been operated, determining the speed of the blower-fan motor in accordance with the state of the blower-fan motor speed currently selected;
(m) actuating the blower-fan motor at the determined blower-fan motor fan speed; and
(n) actuating the air-mix door at the predetermined air-mix door opening percentage,
whereby passenger compartment air temperature is maintained at a preset desired value with the blower fan motor operated at the speed manually selected by the passenger only in the learn control mode.

7. An air-conditioning system by which air temperature within a passenger compartment is controlled, which comprises:

(a) a cooling unit for cooling air introduced into the passenger compartment;
(b) a heating unit for heating air introduced into the passenger compartment;
(c) an air-mix door for directing a portion of the air cooled by said cooling unit toward said heating unit to be heated, said air-mix door open percentage thereby determining the temperature of air outputted into the passenger compartment;
(d) a blower fan motor for driving air through the air conditioning system, said blower fan motor controlling the amount of air outputted into the passenger compartment;
(e) a temperature sensor for detecting passenger compartment air temperature Ta and for generating signals corresponding thereto;
(f) a temperature preset device for presetting passenger compartment air temperature Ts and for generating signals corresponding thereto;
(g) a blower-fan motor speed selecting means for selecting the speed of said blower fan motor and for generating signals corresponding thereto, said selector being manually operated by a passenger;
(h) a blower-fan motor speed determination means connected to said temperature sensor, said temperature preset device and said blower-fan motor speed selecting means for determining blower-fan motor speed in accordance with a predetermined relationship between blower-fan motor speed and the difference between passenger compartment air temperature Ta and preset passenger compartment air temperature Ts;
(i) an air-mix door opening percentage determination means connected to said temperature sensor, said temperature preset device and said blower-fan motor speed selecting means for determining air-mix door opening percentage in accordance with a predetermined relationship between air-mix door opening percentage and the difference between passenger compartment air temperature Ta and preset passenger compartment air temperature Ts which is stored therein;
(j) a memory means connected to said temperature sensor, said temperature preset device and said blower-fan motor speed selecting means for storing the signals inputted therein and for outputting the signal when necessary;
(k) a correction circuit means connected to said blower-fan motor speed determination means and said air-mix door opening percentage determination means for correcting the blower-fan motor speed determined by said blower-fan motor speed determination means and for correcting the air-mix door opening percentage determined by said air-mix door opening percentage determination means in accordance with the detected passenger compartment air temperature Ta, the preset passenger compartment air temperature Ts and the manually-selected blower-fan motor speed S stored in said memory means, said correction circuit means outputting control signals to actuate said blower-fan motor at the corrected blower-fan motor speed and said air-mix door at the corrected air-mix door opening percentage;
whereby passenger compartment air temperature is maintained at a preset desired value with said blower-fan motor operated at the speed manually selected by the passenger.

8. An air conditioning system by which air temperature within a passenger compartment is controlled, which comprises:
   (a) a cooling unit for cooling air introduced into the passenger compartment;
   (b) a heating unit for heating air introduced into the passenger compartment;
   (c) and air-mix door settable to an individual percentage setting for directing a portion of the air cooled by said cooling unit toward said heating unit to be heated, said air-mix door percentage setting thereby controlling the temperature of air outputted into the passenger compartment;
   (d) a blower fan motor for driving air through the air conditioning system, said blower fan motor controlling the amount of air outputted into the passenger compartment;
   (e) a temperature sensor for detecting passenger compartment air temperature Ta and for generating signals corresponding thereto;
   (f) a temperature preset device for presetting passenger compartment air temperature Ts and for generating signals corresponding thereto;
   (g) a blower-fan motor speed selector for manually selecting a speed of said blower fan motor and for generating signals corresponding thereto, said selector being manually operated by a passenger;
   (h) a microcomputer having:
      (1) multiplexer means connected to said temperature sensor, to said temperature preset device and to said blower-fan motor speed selector, for receiving said outputting the corresponding signals sequentially;
      (2) an input interface means connected to said multiplexer means for converting and outputting signals received therefrom;
      (3) a read-only memory means for storing programs to be executed by said microcomputer;
      (4) a random-access memory means for temporarily storing data;
      (5) a non-volatile memory means for storing manually-selected blower-fan motor speed data even after the system is turned off;
      (6) a central processing unit for determining blower-fan motor speed in accordance with a predetermined relationship between blower-fan motor speed and the difference between passenger compartment air temperature Ta and preset passenger compartment air temperature Ts which is stored in said read-only memory means and for determining air-mix door opening percentage in accordance with a predetermined relationship between the air-mix door opening percentage and the difference between the passenger compartment air temperature Ta and the preset passenger compartment air temperature Ts which is stored in said read-only memory means, said central processing unit further operable for correcting the determined blower fan motor speed and the determined air-mix door opening percentage in accordance with the detected passenger compartment air temperature Ta, the preset passenger compartment air temperature Ts and selected blower-fan motor speed S stored in said non-volatile memory means;
      (7) an output interface means for converting and outputting a control signal to operate said blower-fan motor at the corrected blower-fan motor speed and a control signal to actuate said air-mix door at the corrected air-mix door opening percentage,
   whereby the passenger compartment air temperature is maintained at a preset desired value with said blower-fan motor operated at the speed manually selected by the passenger.

9. An air conditioning system by which air temperature within a passenger compartment is controlled for passengers as set forth in claim 8, which further comprises a vehicle speed sensor connected to said input interface means of said microcomputer for outputting output signals corresponding to vehicle speed, the output signals from said vehicle speed sensor being stored in said random-access memory means for use in the correction of the blower-fan motor speed.

10. An air conditioning system by which air temperature within a passenger compartment is controlled as set forth in claim 9, which further comprises a normal-learn selector switch means connected to said input interface means of said microcomputer for outputting a signal indicative of either: (1) a normal control mode in which the air-conditioning system is controlled in accordance with a predetermined relationship between blower-fan motor speed and the difference between the passenger compartment air temperature Ta and the preset passenger compartment air temperature Ts and in accordance with the predetermined relationship between the air-mix door opening percentage and the difference between the passenger compartment air temperature Ta and the preset passenger compartment air temperature Ts, or (2) a learn control mode in which the air-conditioning system is controlled in accordance with the stored detected passenger compartment air temperature Ta, the stored preset passenger compartment air temperature Ts, the stored manually-selected blower-fan motor speed and the stored detected vehicle speed.

11. An air conditioning system by which air temperature within a passenger compartment is controlled as set forth in claim 10, which further comprises a memory-enable switch means connected to said input interface means of said microcomputer for outputting a signal indicative of storing the signals from said blower fan motor speed selector into said non-volatile memory, means when said memory-enable switch means is depressed, in order to repeatedly correct the determined blower-fan motor speed and air-mix door opening percentage in the learn control mode.

12. An air conditioning system by which air temperature within a passenger compartment is controlled as set forth in either of claims 10 or 11, which further comprises a timer unit means provided in said microcomputer for outputting signals indicative of the time elapsed after the air conditioning system has been started in order to operate the system in the learn control mode only within a predetermined time period after the system has been started and in the normal control mode subsequent to expiration of a predetermined time period after the system has been started.

* * * * *